(12) United States Patent
Allen et al.

(10) Patent No.: US 6,184,780 B1
(45) Date of Patent: Feb. 6, 2001

(54) VEHICLE SECURITY SYSTEM HAVING ENHANCED VALET FEATURE AND RELATED METHODS

(75) Inventors: Geoffrey C. Allen, Symrna, GA (US); Kenneth E. Flick, 5236 Presley Pl., Douglasville, GA (US) 30135

(73) Assignee: Kenneth E. Flick, Douglasville, GA (US)

(*) Notice: Under 35 U.S.C. 154(b), the term of this patent shall be extended for 0 days.

(21) Appl. No.: 09/545,264

(22) Filed: Apr. 7, 2000

Related U.S. Application Data

(63) Continuation of application No. 09/374,947, filed on Aug. 16, 1999, which is a continuation of application No. 09/165,997, filed on Oct. 2, 1998, now Pat. No. 5,982,277, which is a continuation of application No. 08/681,785, filed on Jul. 29, 1996, now Pat. No. 5,818,329, which is a continuation of application No. 08/423,570, filed on Apr. 14, 1995, now Pat. No. 5,654,688.

(51) Int. Cl.$^7$ .................................................. B60R 25/10
(52) U.S. Cl. ................ 340/426; 340/425.5; 340/825.69; 340/825.72; 340/825.31; 340/825.32; 340/539; 307/10.2
(58) Field of Search .................... 340/426, 425.5, 340/825.31, 825.32, 825.69, 825.72, 541, 539; 307/10.2

(56) References Cited

U.S. PATENT DOCUMENTS

| 4,205,300 | 5/1980 | Ho et al. ............................ 340/65 |
| 4,327,444 | 4/1982 | Court ................................ 455/100 |
| 4,383,242 | 5/1983 | Sassover et al. ................... 340/64 |
| 4,414,541 | 11/1983 | Ho ................................... 340/566 |
| 4,450,437 | 5/1984 | Ho ................................... 340/540 |
| 4,628,400 | 12/1986 | Ho ................................... 361/172 |
| 4,674,454 | 6/1987 | Phairr .............................. 123/179 B |
| 4,754,255 | 6/1988 | Sanders et al. ..................... 340/64 |
| 4,812,814 | 3/1989 | Elliott ............................... 340/332 |
| 4,893,240 | 1/1990 | Karkouti .......................... 364/424.05 |

(List continued on next page.)

FOREIGN PATENT DOCUMENTS

WO 92/02702 2/1992 (EP) .............................. E05B/49/00

OTHER PUBLICATIONS

Lexus, *1995 Repair Manual SC400 SC300*, vol. 3, (first printing Jan. 10, 1994) pp. BE–479–BE–522.

*Primary Examiner*—Julie Lieu
(74) *Attorney, Agent, or Firm*—Allen, Dyer, Doppelt, Milbrath & Gilchrist, P.A.

(57) ABSTRACT

A vehicle security system includes a controller being switchable to a valet mode based upon determining a plurality of successive activations of a valet switch with each activation comprising at least one operation of the valet switch, and based upon determining at least one change in ignition switch position between successive activations of the valet switch. The security system also preferably includes at least one vehicle sensor, an ignition monitor for determining whether a vehicle ignition switch is in an off position or an on position, an alarm indicator for indicating an alarm, and all of which are preferably connected to the controller. The controller may be switchable to an armed mode in which the controller is capable of generating an alarm responsive to triggering of the at least one vehicle sensor. The controller when in the valet mode prevents generation of an alarm responsive to triggering of the at least one vehicle sensor. The controller may be switchable to the valet mode based upon determining the ignition switch being in the on position during each activation of the valet switch. In addition, the at least one change in ignition switch position may comprise a change to the off position. A pseudorandomly coded remote transmitter may be used to switch the controller between armed and disarmed modes.

33 Claims, 6 Drawing Sheets

U.S. PATENT DOCUMENTS

| | | | |
|---|---|---|---|
| 5,024,186 | 6/1991 | Long et al. | 123/179 B |
| 5,040,990 | 8/1991 | Suman et al. | 439/34 |
| 5,049,867 | 9/1991 | Stouffer | 340/426 |
| 5,103,221 | 4/1992 | Memmola | 340/825.31 |
| 5,129,376 | 7/1992 | Parmley | 123/179.2 |
| 5,132,660 | 7/1992 | Chen et al. | 340/428 |
| 5,146,215 | 9/1992 | Drori | 340/825.32 |
| 5,159,334 | 10/1992 | Baumert et al. | 340/825.72 |
| 5,278,547 | 1/1994 | Suman et al. | 340/825.32 |
| 5,285,186 | 2/1994 | Chen | 340/428 |
| 5,309,144 | 5/1994 | Lacombe et al. | 340/539 |
| 5,323,140 | 6/1994 | Boyles | 340/428 |
| 5,365,225 | 11/1994 | Bachhuber | 340/825.31 |
| 5,412,379 | 5/1995 | Waraksa et al. | 340/825.72 |
| 5,467,070 | 11/1995 | Drori et al. | 340/426 |
| 5,469,151 | 11/1995 | Lavelle et al. | 340/825.36 |
| 5,534,845 * | 7/1996 | Issa et al. | 340/425.5 |
| 5,654,688 * | 8/1997 | Allen et al. | 340/426 |
| 5,801,455 * | 9/1998 | Borch et al. | 307/10.3 |
| 5,818,329 * | 10/1998 | Allen | 340/426 |
| 5,982,277 * | 11/1999 | Flick | 340/426 |
| 6,028,505 * | 2/2000 | Drori | 340/426 |
| 6,037,859 * | 3/2000 | Flick | 340/426 |

\* cited by examiner

VEHICLE SECURITY SYSTEM HAVING ENHANCED VALET FEATURE AND RELATED METHODS

This application is a continuation of U.S. patent application Ser. No. 09/374,947, filed Aug. 16, 1999 which, in turn, is a continuation of Ser. No. 09/165,997 Oct. 2, 1998 now U.S. Pat. No. 5,982,277 which, in turn, is a continuation of Ser. No. 08/681,785 Jul. 29, 1996 now U.S. Pat. No. 5,818,329 which, in turn, is a continuation of Ser. No. 08/423,570 Apr. 14, 1995 now U.S. Pat. No. 5,654,688, the entire disclosures of all of which are incorporated herein by reference.

FIELD OF THE INVENTION

The present invention relates to the field of security systems and, more particular, to a security system for installation in a vehicle.

BACKGROUND OF THE INVENTION

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or within the vehicle. Ultrasonic and microwave motion detectors, vibration sensors, sound discriminators, differential pressure sensors, and switches may also used as sensors. In addition, radar sensors may be used to monitor the area proximate the vehicle. The controller also typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition.

A typical security system also includes a receiver associated with the controller that cooperates with one or more remote transmitters typically carried by the user as disclosed, for example, in U.S. Pat. No. 4,383,242 to Sassover et al. The remote transmitter may be used to arm and disarm the controller in the vehicle or provide other remote control features from a predetermined range outside the vehicle.

As disclosed in U.S. Pat. No. 5,049,867 to Stouffer and U.S. Pat. No. 5,146,215 to Drori, the controller may include features to store and compare unique codes associated with a plurality of remote transmitters, each remote transmitter having its own unique code initially programmed therein. Transmitter codes may be added or deleted from the controller corresponding to the number of remote transmitters desired by the user. Unfortunately, a would-be thief gaining access to the controller may readily enter the programming or learn mode and install the code of an unauthorized remote transmitter. The owner would thus be unaware of such activity, until the thief returns with the unauthorized remote transmitter to disarm the security system and steal the vehicle.

A vehicle security system sold by Clifford under the trademark INTELLIGUARD 900 includes random code encryption of messages sent by a remote transmitter. Accordingly, a would-be thief who records a transmitted code cannot simply retransmit the same code to gain access to the vehicle. Rather, a different code is sent with each transmission of the remote transmitter. In other words, the security system is somewhat resistant to being disarmed by a code grabber or a code scanner. However, the security system simply ignores signals other than properly encrypted signals.

In addition, a typical security system includes a valet switch, for example, to permit the system to enter the so-called valet mode, wherein the alarm functions are disabled. The valet mode permits authorized use the vehicle by a technician or valet without concern for the vehicle alarm inadvertently being triggered. Typically, the valet switch is positioned away from plain view in the vehicle. A vehicle security system sold under the mark VIPER included the ability to enter the valet mode via a remote transmitter. The remote activation disabled security features of the system, but left convenience features still operable.

SUMMARY OF THE INVENTION

In view of the foregoing background, it is therefore an object of the invention to provide a vehicle security system and related method having a more secure valet operation.

This and other objects, features and advantages in accordance with the invention are provided by a vehicle security system comprising a controller being switchable to a valet mode based upon determining a plurality of successive activations of a valet switch with each activation comprising at least one operation of the valet switch, and with at least one change in ignition switch position between successive activations of the valet switch. The security system also preferably includes at least one vehicle sensor, an ignition monitor for determining whether a vehicle ignition switch is in an off position or an on position, an alarm indicator for indicating an alarm, and all of which are preferably connected to the controller. The controller may be switchable to an armed mode in which the controller is capable of generating an alarm responsive to triggering of the at least one vehicle sensor. The controller when switched as explained above stops or prevents the generation of an alarm indication so that the user may still use the vehicle despite failure or loss of a remote transmitter, for example.

The controller may be switchable to the valet mode based upon determining the ignition switch being in the on position during each activation of the valet switch. In addition, the at least one change in ignition switch position may comprise a change to the off position.

The vehicle security system may also comprise at least one remote transmitter to be carried by the user, and a receiver at the vehicle for receiving signals from the at least one remote transmitter. The controller may be connected to the receiver for switching between an armed mode and a disarmed mode responsive to the at least one remote transmitter. In addition, the at least one remote transmitter may use a pseudorandom code.

A method aspect of the invention is for switching a vehicle security system to a valet mode responsive to activation of a valet switch and based upon the ignition switch position to provide enhanced security. More particularly, the method may include switching the controller to a valet mode based upon determining a plurality of successive activations of the valet switch with each activation comprising at least one operation of the valet switch, and at least one change in ignition switch position between successive activations of the valet switch.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, applicants provide these embodiments so that this disclosure will be thorough and complete, and will fully convey the scope of the invention to those skilled in the art. Like numbers refer to like elements throughout.

Figure 1:
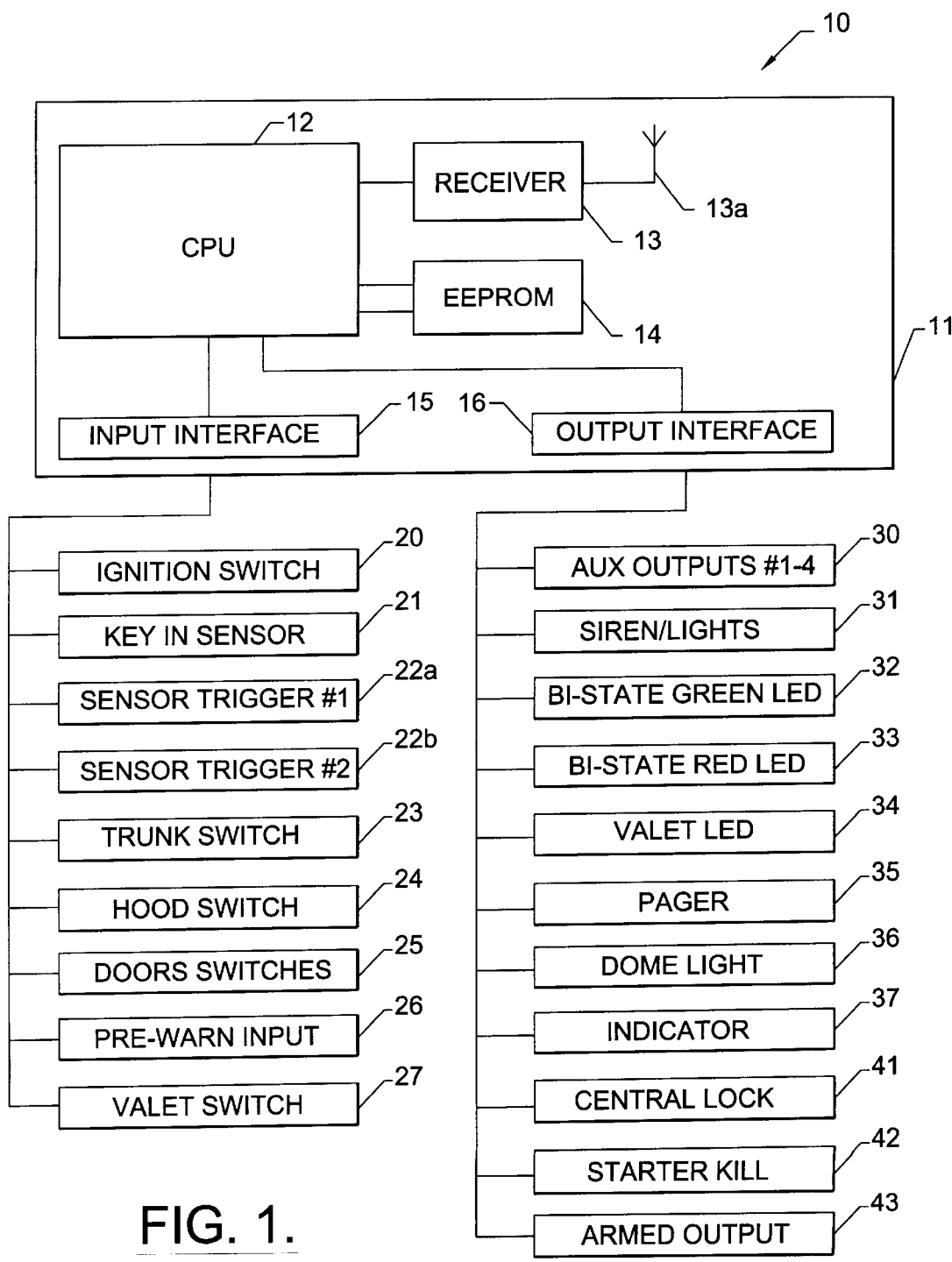
FIG. 1 is a schematic block diagram of the vehicle security system according to the invention.

Referring first to the schematic block diagram of FIG. 1, the vehicle security system 10 according to the invention is first described. The security system includes a controller 11 which, in turn, in the illustrated embodiment, includes a central processing unit or microprocessor 12 operating under stored program control. A receiver 13 is connected to the microprocessor 12 for receiving signals from a remote transmitter as will be described in greater detail below. An antenna 13a is illustratively connected to the receiver 13. In the illustrated embodiment, the microprocessor is also operatively connected to a memory (EEPROM) 14 and a conventional input interface 15 and an output interface 16.

In the illustrated embodiment, the input interface 15 is connected to various vehicle inputs including: an ignition switch 20; a key in the ignition sensor 21; two zone sensors 22a, 22b; and conventional trunk hood and door pin switches 23, 24, and 25, respectively. In addition, a pre-warn sensor 26 and valet switch 27 also provide inputs to the controller 11 in the illustrated embodiment. As would be readily understood by those skilled in the art, other inputs are also contemplated by the present invention and are generally described herein by the term sensor.

The output interface 16 of the controller 11 may preferably be connected to a plurality of outputs. As shown in FIG. 1, the outputs may include auxiliary relay outputs 30, such as for window control or remote starting, as would be readily understood by those skilled in the art. A siren and/or lights 31, and green and red light emitting diodes (LEDs) 32, 33 for dashboard mounting are also connected to the controller 11. Other outputs are directed to a valet LED 34, a dome light 36, and indicator 37, a central lock 41, a starter kill circuit 42, and an armed relay output 43.

Figure 2:
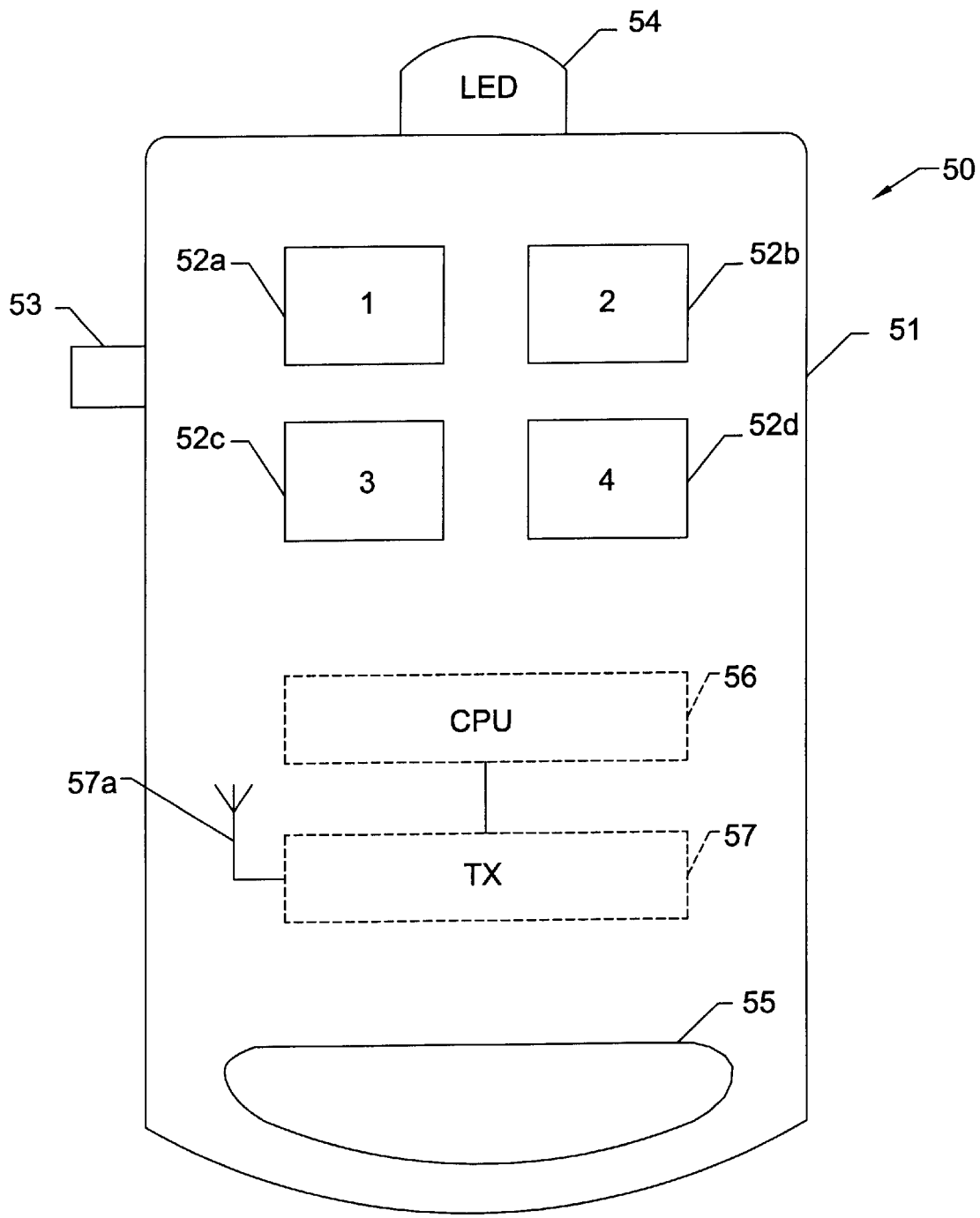
FIG. 2 is a schematic block diagram of a remote transmitter for the vehicle security system according to the invention.

Referring now additionally to FIG. 2, a remote transmitter 50 in accordance with the invention is described. The remote transmitter 50 includes a housing 51 and a plurality of first momentary contact switches 52a–52d carried by the housing. A second momentary contact switch 53 and an indicating light, such as the LED 54 are also carried by or mounted on the housing 51. As would be readily understood by those skilled in the art, the remote transmitter 50 is typically relatively small and includes an opening 55 for facilitating connection to a vehicle keyring. In addition, the remote transmitter 50 includes a central processing unit or microprocessor 56 operatively connected to the plurality of first switches 52a–52d, the second switch 53, and the LED 54. The microprocessor is also connected to a transmitter circuit 57 and its associated antenna 57a for transmitting signals to the controller 11 of the vehicle security system 10.

The controller 11 preferably includes remote transmitter adding means for permitting addition of a coded remote transmitter 50 capable of switching the controller between armed and disarmed modes. In the armed mode the controller 11 is capable of generating an alarm via alarm indication means, such as the siren and/or flashing lights 31. The controller 11 generates the alarm responsive to at least one of the vehicle sensors, such as the trunk, hood and door switches 23, 24 and 25, or the other sensors 22a, 22b as would be readily understood by those skilled in the art. In the disarmed mode the controller 11 does not generate an alarm responsive to the vehicle sensors.

Figure 3:
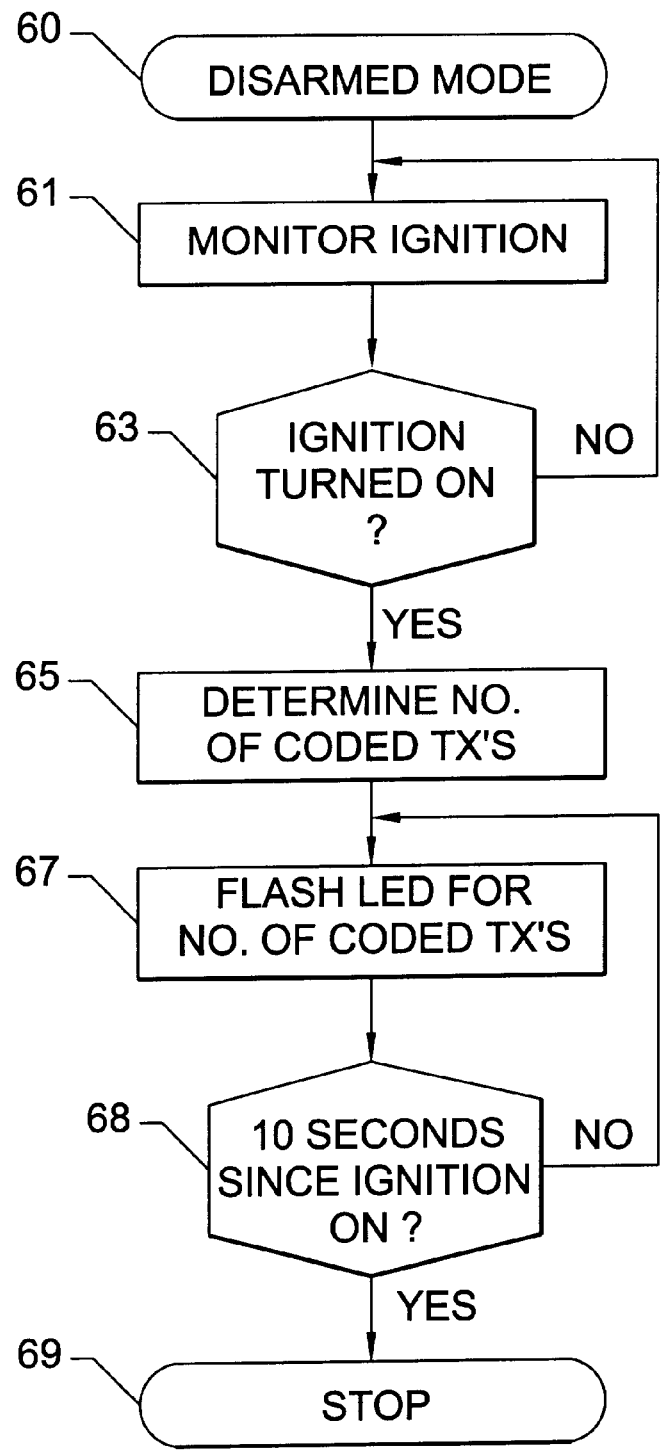
FIG. 3 is a flow chart illustrating remote transmitter verification according to the invention.

Referring now additionally to FIG. 3, an aspect of the vehicle security system 10 relating to protection against unauthorized disarming of the vehicle security system 10 is described. The controller 11 preferably comprises remote transmitter verification means for generating a signal based upon a number of coded remote transmitters 50 capable of switching the controller from the armed mode to the disarmed mode. The remote transmitter verification means preferably comprises indicating means for indicating to a user a number of coded remote transmitters. In other words, indicating means, such as a dashboard mounted light emitting diode 32, 33 may be flashed a number of times corresponding to the number of coded remote transmitters. Accordingly, the user is ensured that only the coded remote transmitters 50 under his control may operate the vehicle security system 10. Should the user determine that an unauthorized remote transmitter has been added or coded to operate the controller 11, the controller also preferably includes means for deleting the newly added transmitter or all of the coded remote transmitters capable of switching the controller between the armed and disarmed modes.

The controller 11 preferably includes ignition monitoring means 20 for determining whether a vehicle ignition switch is in an off position or an on position as monitored at Block 61 and when the controller is in the disarmed mode (Block 60). If the ignition is switched on (Block 63), the number of coded transmitters is determined (Block 65). The controller 11 also preferably includes activating means for activating an LED 31, 32 to indicate the number of coded transmitters 50 at Block 67 responsive to turning the vehicle ignition to the on position and when the controller is in the disarmed mode. The number of coded transmitters 50 may be repeated for a predetermined time, such as ten seconds, at Block 68. The verification feature is then stopped (Block 69). If unsure, the driver could turn the ignition off, and then back to the on position, to again verify the number of coded remote transmitters 50.

Another aspect of the invention relates to receiving coded transmission from the remote transmitter 50. The controller 11 further preferably comprises decoding means, such as for switching the controller from the armed mode to the disarmed mode responsive to receiving a predetermined coded signal from a remote transmitter 50. The controller 11 also preferably includes unauthorized code detecting means for generating an alarm based upon receipt of a coded signal other than the predetermined coded signal from the remote transmitter 50.

Figure 4:
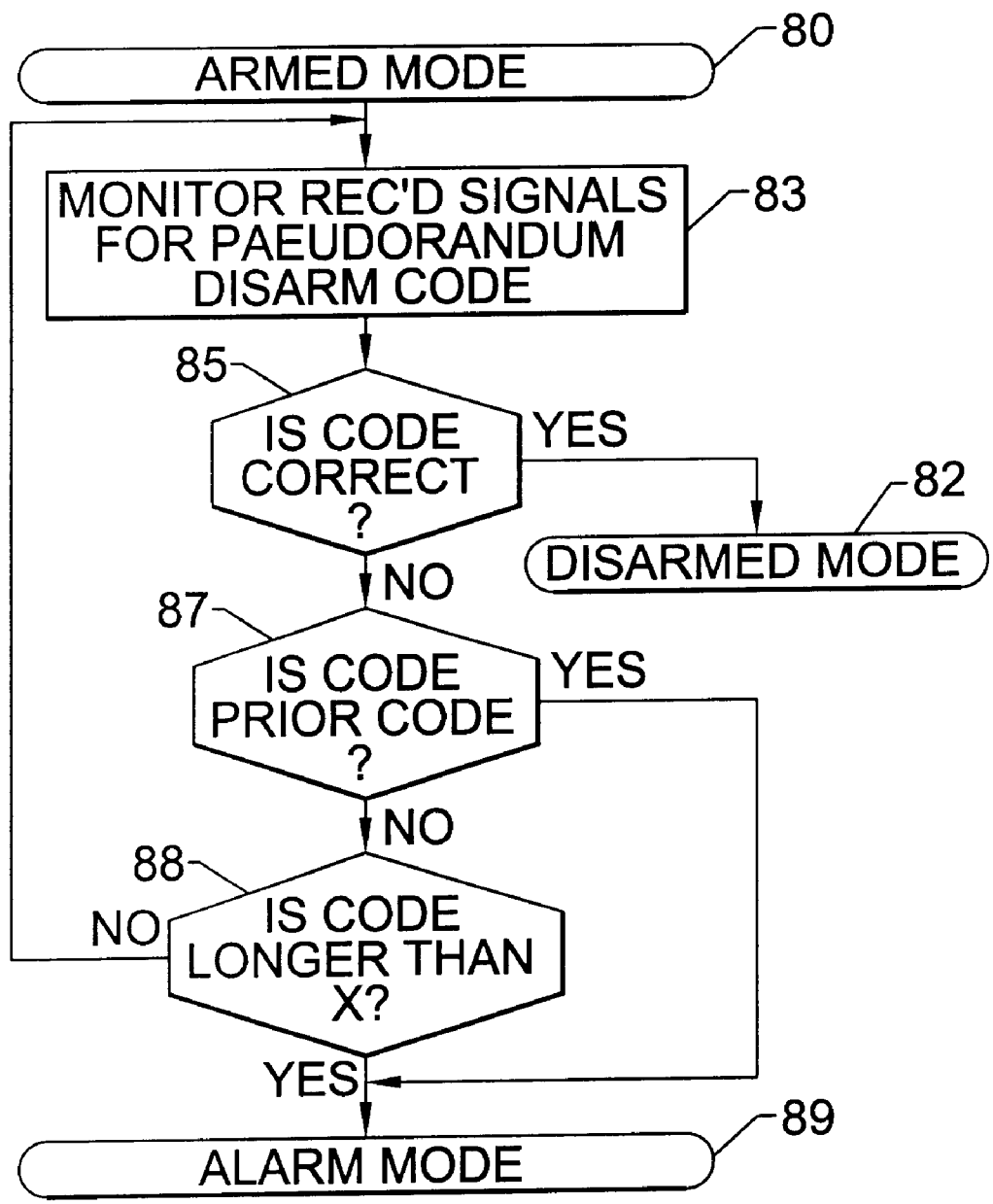
FIG. 4 is a flow chart illustrating protection against attempted disarming of the security system according to the invention.

Referring additionally to the flow chart of FIG. 4, the decoding means of the controller 11 may comprise pseudorandom decoding means for monitoring received signals (Block 83) and switching the controller 11 between the armed mode (Block 80) and the disarmed mode (Block 82) responsive to receiving a correct pseudorandomly coded signal from the remote transmitter 50 (Block 85). Accordingly, the unauthorized code detecting means may comprise means for detecting a previously received pseudorandomly coded signal as determined at Block 87.

The unauthorized code detecting means may also comprise means for detecting a code having a length greater than a predetermined length of the coded signal from the remote transmitter as determined at Block 88. Whether the code is a repeat of the pseudorandom code or a relatively long code stream, the controller will go to the alarm mode (Block 89) and sound the siren and/or flash the lights, and/or initiate a pager to thereby indicate an alarm. Accordingly, not only does the vehicle security system 10 protect the vehicle in which it is installed, but protection may also be provided for nearby vehicles when a would-be thief is using a code grabber or a code scanner.

As would be readily understood by those skilled in the art the code grabber records and repeats a previously transmitted code, such as to switch the security system to the disarmed mode, thereby enabling theft of the vehicle. The code scanner may be used to try a sequence of codes in the hopes that the disarm code will be generated and received by a vehicle security system, as would also be understood by those skilled in the art.

The microprocessor 56 of the remote transmitter 50 preferably generates a pseudorandom code associated to a different function. All buttons 52a–52d on the transmitter that control the various functions will transmit a different code or protocol each and every time one of the buttons on the transmitter is pressed. The table defined below shows how the assignment of the four illustrated buttons may be related to the functioning of the vehicle security system 10 in one embodiment. The microprocessor 56 will have the ability to distinguish the time that each of the buttons 52a–52d has been depressed. Hence, two functions will be available per button and the following remote control functions may be readily implemented:

| Button | Duration | Function |
| --- | --- | --- |
| 1 | Momentary | Arm/Disarm the system |
| 1 | Two Seconds | Remote Panic |
| 2 | Momentary | Stealth Arm/Disarm |
| 2 | Two Seconds | Pulsed output on aux. #1 |
| 3 | Momentary | Timed output on aux. #2 |
| 3 | Two Seconds | Timed output on aux. #3 |
| 4 | Momentary | Timed output on aux. #4 |
| 4 | Two Seconds | Controlled Access Valet |

The second switch 53 carried by the transmitter housing 51 may increment to the next bank of features when momentarily depressed. If held depressed, the transmitter causes display of the current bank as indicated by flashing of the LED 54. In addition, once a bank besides bank #1 has been selected and no further input is detected by the microprocessor 56, the transmitter 50 may revert back to bank #1 after thirty seconds.

The bi-state LED 54 carried by the remote transmitter housing 51 may display information in the following format. For buttons 52a–52d, the LED is illuminated steady RED for the duration of transmission whether depressed less than or more than two seconds. If the second switch 53 is depressed less than two seconds, the LED flashes GREEN in accordance with bank selected, i.e., if bank 1 is selected, the GREEN LED will flash once. Similarly, of the second switch 53 is depressed more than two seconds, the LED 54 indicates the current bank that the transmitter is in, i.e., if bank 4 is selected, the LED will flash GREEN 4 times. As long as the second switch is held depressed, the LED will continue to flash its current bank with pauses between flashes.

The last feature bank selected may alternately be stored in memory along with its associated coding protocols, and remain stored until such time that the bank is changed. Each and every time that the transmitter buttons are activated, the transmitter will transmit the code associated with the bank selected. Transmission of a code occurs when the button is released. The LED will remain on even once the transmitter button has been released, and until such time that the transmission is complete. The vehicle security system 10 may have the ability to learn one of the 4 banks from any four independent remote transmitters 50, or all four banks from a single remote transmitter.

While the vehicle is being driven, the security system 10 is in the drive or free mode and the following outputs will be switched off:

AUXILIARY #1 OUTPUT
AUXILIARY #2 OUTPUT
AUXILIARY #3 OUTPUT
AUXILIARY #4 OUTPUT
SIREN OUTPUT
BI-STATE LED (G)
BI-STATE LED (R)
VALET LED OUTPUT
VALET LED OUTPUT
PAGER OUTPUT
DOME LIGHT OUTPUT
INDICATOR OUTPUT
CENTRAL LOCK OUTPUT
STARTER KILL OUTPUT
ARMED OUTPUT 500 mA

In addition, while the vehicle is being driven, the following inputs will also be ignored:

KEY IN SENSOR +/−
SENSOR TRIGGER #2
SENSOR TRIGGER #1
TRUNK
HOOD
DOORS +/−
PRE-WARN INPUT

While the vehicle is in the drive mode, the system will respond to a remote panic if button #1 52a on the remote transmitter 50 is pressed for two seconds. When the ignition switch of the vehicle is turned to the on position, the system 10 will check to see if Door Lock Ignition On is selected. If selected, the doors will lock in accordance with the programmed time parameter. When the ignition switch of the vehicle is turned to the on position, the system will check to see if the full valet has been selected. If selected, the Bi-State LED will light up orange.

Switching off the ignition will revert the system to the disarmed mode state. The bi-State LED will indicate one of the following states:

| | |
|---|---|
| STEADY RED LED | System Disarmed |
| FLASHING GREEN LED | Partial Valet Selected |
| STEADY GREEN LED | Full Valet Selected |

Upon detection that the ignition switch has been turned off, the system will check to see if the dome light on has been selected, and check to see if the ignition key is in the ignition or not. If selected, the dome light will turn on. If the ignition key has not been removed from the ignition switch, the dome light will remain on, and the system 10 will respond to a remote panic signal, and turning on the ignition which reverts the system to the free mode.

As long as the ignition key is detected in the ignition switch, the dome light will remain on, and the system 10 will not change state. If the key is left in the ignition switch and the last entry/exit point is closed, the system will initiate a audible and visual indication that the key has been left in the ignition. This will continue until such time that the key is removed from the ignition switch. If the ignition key has been removed from the ignition switch, the system will start a 30 second timer. If nothing else occurs, upon expiry of the 30 second timer, the dome light will switch off. The system will wait until such time that the system detects the opening and closing of a door. During the period of waiting for a door to be opened and closed, the system 10 will respond to any of the buttons on the remote transmitter 50.

After closing the last door with the key out of the ignition, the system initiates a 30 second timer during which time the system will respond to any of the following conditions:

a) Check for a arm/disarm code from the remote transmitter. If a valid code is received, the system will react to the programmed condition which is to initiate the arming condition.

b) Check for a panic code from the remote transmitter. If a valid code is received, the system will react to the programmed panic condition.

c) Check for partial valet code from the remote transmitter. If a valid code is received, the system will react to the programmed condition which is a flashing GREEN LED.

d) Check for an auxiliary #1 to #4 code from the remote transmitter. If a valid code is received, the output will react to the programmed condition. This output can be either latched or pulsed.

e) Check for valet forgery. If the incorrect sequence is attempted, the system will revert to its programmed condition.

f) Monitor the pre-warn input. If detected, the system will revert to passively arming the system.

If the key is inserted into the ignition before the expiry of the 30 second timer, then the system will revert to waiting until such time that the key is removed. If the ignition switch is turned on the system 10 will revert to the free mode.

Upon the expiry of the 30 second timer, the system will change state to arming the system 10 as follows: chirp the siren twice, flash the indicators twice, lock the doors, if selected in the lock doors with auto arming, and flash the RED LED fast for alarm arming.

Active arming of the vehicle security system 10 is a default and the system will respond to button #1 52a or button #2 52b on the remote transmitter 50. Button #1 on the remote transmitter arms the system with audible sounds. Button #2 arms the system with no sounds, that is, stealth arms the system. If the key is left in the ignition, the system 10 will not respond to the remote transmitter 50.

Once the ignition key has been removed and the system 10 detects a valid code from the remote transmitter 50, the system will react as follows: chirp the siren twice, flash the indicators twice, lock the doors, flash the RED LED fast for alarm arming, and switch on the armed output.

At this point in time two events occur namely: a 30 second alarm arming timer will be initiated, and the system 10 will run a complete diagnostic of all sensor and pin circuits, that is, run a sensory auto test and report. Should a sensor or pin circuit not come on line properly, then the system will revert to suspending the arming cycle. Should the ignition switch be turned on at this point in time, the system 10 will revert to the free mode.

During the 30 second alarm arming condition, if button #1 or #2 is pressed, the system 10 will revert to the fully armed mode and sound the chirps according to which button was pressed and accordingly: chirp the siren twice, flash the indicators twice, and flash the RED LED slow. If no reception of a code from the remote transmitter 50 is received, then upon the expiry of the 30 second alarm arming timer, the following events will take place: chirp the siren twice, flash the indicators twice, flash the RED LED slow for a alarm armed.

The vehicle security system is now in the armed mode and will monitor the following vehicle sensor inputs for a trigger condition:

IGNITION INPUT
DOORS+/−
PRE-WARN INPUT
VALET INPUT
is SENSOR TRIGGER #1
SENSOR TRIGGER #2
HOOD
TRUNK

The security system 10 may be passively armed based upon monitoring the last entry/exit point. Passive arming is a system default, and must be programmed out if not required. If passive arming has been selected, the system 10 will arm by monitoring the last entry/exit point on the vehicle. If the key is left in the ignition, the system will not respond to passively arming the system. Once the ignition key has been removed and the system detects the closure of the last entry/exit point, the system will initiate a 30 second timer. Upon the expiry of the 30 second timer, the system will chirp the siren twice, flash the indicators twice. In addition, the doors will be locked only if selected in the user program. The default is that the doors will not lock. The RED LED will flash fast indicating that the alarm is arming. A complete diagnostic of all sensor and pin circuits will be run, that is, the sensory auto test and report. Should a sensor or pin circuit not come on line properly, the system will revert to suspending the arming cycle.

If while in the arming cycle, a code from the remote transmitter 50 is detected, the doors will lock. Should the ignition switch be turned on at this point in time, the system will revert to the free mode.

The system is now in the armed mode and will monitor the following inputs for a trigger condition:

IGNITION INPUT
SENSOR TRIGGER #2
SENSOR TRIGGER #1
TRUNK
HOOD

DOORS+/−
PRE-WARN INPUT
VALET INPUT

If the passive arming mode is programmed out, and the system 10 detects the last entry/exit point being closed, the system will remain in the disarmed state (steady red LED).

When an alarm condition is detected by the system 10, the siren will switch on for the selected programmed time duration. The system default of the siren duration is 30 seconds, but this time parameter may be changed in the installer program to one of the following time parameters: 60, 90, or 120 seconds.

When the alarm condition is activated, the following occurs: the starter kill circuit becomes active, the pager output switches on, and the hazards and interior light flash in unison with the siren.

Disarming the system is achieved by pressing button #1 or button #2 52a, 52b on the remote transmitter 50. If button #1 is pressed the system will disarm with audible sounds, and if button #2 is pressed the system will disarm without audible sounds. Once a valid code is received from the transmitter 50, the system 10 will respond as follows:

a) The siren will chirp once and the hazards will flash once.
 b) The siren will chirp three times and the hazards will flash three times if intrusion was detected while the system was armed.
 c) The siren will chirp four times and the hazards will flash four times if arming of the system was initiated with one of the sensors not being brought on line during the arming cycle.
 d) The doors will unlock.

In both active and passive arm modes, the system LED will revert to STEADY RED when the system 10 is disarmed. In the event of the siren chirps being programmed out in the installer program, the system 10 will continue to confirm the state of the system via the hazard lights of the vehicle.

If the system 10 is inadvertently disarmed, and the system does not detect any of the doors of the vehicle being opened within 30 seconds of the vehicle being disarmed, the following events will occur: the system will begin to passively arm the system indicated by the fast flashing LED, after 30 seconds arm the system, as indicated by the slow flashing red LED, and the doors will be locked.

The sensory auto test and report is a programmable feature, and the default of the system 10 is this feature programmed in. It may be disabled in the user program mode. Each time the system 10 is armed by pressing button #1 52a or button #2 52b on the transmitter 50 the system will automatically run a complete diagnostic of all sensor and pin circuits. Should a sensor or pin circuit not come on line normally, the system will suspend arming whereby the siren will report via short high pitched bleeps at 2 second intervals to indicate that the arming cycle has been suspended due to one of the sensor or pin circuits not functioning properly.

If while in this state transmitter button #1 or #2 52a, 52b is pressed again, the siren will generate a squawk sound indicative that the system 10 has armed with one of the pin or sensor circuits faulty. If button #1 or #2 on the transmitter is not pressed, the system will rearm after a period of 1 minute accompanied by the same squawk sound.

This feature may also be used to suspend the arming cycle of the system during the arming countdown. This will occur when the system is armed and during the 30 second arming countdown cycle one of the pin switches is activated, i.e., one of the doors of the vehicle is opened, the system 10 will report via short high pitched bleeps at 2 second intervals to indicate that the arming cycle has been suspended due to one of the pin circuits having been activated. As long as the associated pin switch is active, the system will maintain suspension of the arming cycle. Upon reverting the associated pin switch to its normal position, i.e., closing the door of the vehicle, the system will once again initiate the 30 second arming countdown cycle.

Upon disarming, the system 10 will report via 4 confirmation chirps and flashes on the hazards as opposed to the one chirp and flash of the hazards when disarming the system without any faulty inputs. When the system is disarmed with a faulty pin switch or sensor, the system will indicate via the system bi-state LED what sensor is not functional, and simultaneously store it in the system memory so that it may be retrieved.

The security system 10 also includes false alarm auto correction sensor control. This feature is a programmable feature, and the default of the system is this feature programmed in. It may be disabled in the user program. Once the system enters the armed mode, both sensor #1 22a and sensor #2 22b can trigger the alarm condition. Once a sensor has initiated a full alarm response, and the sensor that initiated the alarm condition, be it sensor #1 or sensor #2 is activated again, then the alarm condition will respond by sounding the alarm for 10 seconds and resetting to the armed mode. Should the same sensor activate the alarm condition for the second time, the system will respond by sounding the alarm for a 5 second period and reset to the armed mode. Should the same sensor that triggered the alarm condition attempt to trigger the alarm condition for a fourth consecutive time, then the system will ignore the sensors input, that is, zone it out. Once the sensor that triggered 3 consecutive triggers (be it sensor #1 22a) is zoned out, the system will continue to monitor the status of sensor #2 22b. Should sensor #2 follow the same pattern as sensor #1, i.e., trigger the alarm condition for 3 consecutive periods, then the microprocessor will in turn ignore sensor #2 22b and revert to monitoring sensor #1 22a. If disabled in the program mode, only the control mechanism will be removed but the system will continue to monitor sensors #1 and #2 as normal trigger inputs and if detected will initiate a full alarm response for the programmed siren duration. Sensors #1 and #2 may be programmed out in the program mode if one of the sensors are at continual fault.

A two second activation of button #1 52a on the remote transmitter 50 will revert the system 10 into the panic mode. The system will enter this mode regardless of the ignition of the vehicle being on or off. The following scenarios are taken into account. If the system is disarmed with ignition off and panic activated (driver inside vehicle), the doors of the vehicle will lock, and the system will enter the panic cycle. If the system 10 is in drive mode (ignition on) and the panic activated (vehicle being driven), the doors will lock if the doors have not been locked, and the system will enter the panic cycle. If the system 10 is armed and the panic activated (doors will be locked, system armed and the driver outside of the vehicle), the doors will unlock and the system will enter the panic cycle. Upon closing of the last door, all doors will be locked. If a siren has been activated by a trigger condition and the remote panic button is pressed, the system will revert to the panic mode. The doors will unlock and the system will enter the panic mode.

In all cases, upon the entry into a panic mode, the system 10 will sound the siren for 15 seconds, thereafter look at the ignition switch to check whether it has been switched on. If it has been switched on within 15 second period, then the system 10 will revert to whatever mode the system was in prior to the panic mode being initiated. If the ignition switch has not been switched on during the 15 second period, then the siren will sound for a further 15 seconds whereafter it will return to its previous mode.

In the panic mode, the vehicle security system 10 will allow the driver of the vehicle to start the vehicle. This is provided to allow the driver of the vehicle to make a quick escape. In all the cases mentioned, the momentary pressing of the arm/disarm button on the remote transmitter 50 will cancel the panic state. If the vehicle is being driven, pressing the arm/disarm button momentarily will revert the system to free mode. If the panic state has been activated accidentally while the system is in the armed state, upon expiry of the panic cycle, the system will revert to the passive arming cycle for 30 seconds and then revert to the armed state and lock the doors. In the panic cycle whenever activated, the hazards will flash in unison with the siren.

The remotely activated valet (partial valet) operates as follows. When button #4 52*d* on the transmitter 50 is pressed for 2 seconds while in the disarmed mode (steady RED LED), the system will enter into a partial valet condition. Upon entering the partial valet condition, the system bi-state LED will flash GREEN. Upon this mode being entered, the system 10 will maintain full operational status with the exception of the following trigger functions:

Sensor trigger #1
Sensor trigger #2
Pre-Warn
Door switches
Ignition input

Should the trunk and hood be tampered with in the partial valet mode, the system 10 will sound the siren and flash the hazards for the programmed siren duration. The following functions will still be available in the partial valet condition:

Auxiliary #1–#4 outputs
Key in sensor
Trunk input
Hood input
Siren output
Bi-state LED
Pager output
Dome light output
Indicator output
Central lock output
Armed output 500 mA To exit the partial valet condition, button #4 52*d* on the transmitter 50 is pressed again when the system is in the partial valet mode (flashing GREEN LED).

A full valet condition in the disarmed state may be entered as follows. The full valet condition is achieved by depressing the valet button for 4 seconds while the system 10 is disarmed with the ignition switch of the vehicle in the on position. If the ignition switch of the vehicle is off, the system 10 will not register the valet button 27 but instead detect valet forgery.

Once the full valet condition has been entered into, the system LED will light up STEADY GREEN and no operational functions will be available from the system. When the ignition switch of the vehicle is turned to the on position, the system LED will light up orange. To revert the system back to its original condition, the valet button 27 is once again depressed momentarily while the ignition of the vehicle is in the on position.

Entering the full valet condition while the system is in the armed state occurs normally when the owner of the vehicle has lost the remote controls 50 to the system, or the remote controls to the system are not functional. In this case, the system will be armed and the operator unable to deactivate the system. Upon entering the vehicle in the armed state a full alarm trigger to the system will occur. A signature valet code is programmed into the system in the installer programming set-up. The default of the system is 3 counts. During this cycle the user must observe the following procedure to enter the system into a full valet condition:

1. The ignition switch of the vehicle must be turned to the on position.
2. The valet button must be momentarily pressed either the default 3 times, or the programmed n times that was selected in the installer set-up mode.
3. The system will now enter the full valet mode condition, or another iteration of turning the ignition off then on, followed by pressing the valet switch for a second number of times may be optionally selected.
4. All functions on the system will now be overridden and the system bi-state LED will revert to a STEADY GREEN state.

To revert the system back to its original condition, the valet button is depressed momentarily while the ignition of the vehicle is in the on position.

The vehicle security system may also include signature valet forgery detect and alert features for attempting to initiate a full valet condition with the ignition switch in the off position with the system disarmed. If the system is in the disarmed state, and attempt is made to initiate a full valet condition without first turning the ignition switch to the on position, the system will respond as following:

1. The system will flash the interior and hazard lights for 30 seconds. During this period the system will not recognize the valet switch 27.
2. Upon expiry of the 30 second period an attempt can once again be made to initiate a full valet condition.
3. If upon the second attempt at attempting to initiate a full valet condition without first turning on the ignition switch, the system will once again flash the interior and hazard lights for 30 seconds.
4. If upon the third attempt at trying to initiate a full valet condition without first turning on the ignition switch, the system will flash the interior lights and hazards for 1 minute after which the system will automatically begin passive arming after which the system will enter the fully armed state.

If attempt is made to initiate a full valet condition while the system 10 is in the armed mode without adhering to the conditions of a full valet system in the armed mode, i.e., not entering the correct valet code, and without activating the alarm condition, the system will start a timer for 60 seconds, and flicker the dome light and not the hazards, as these have already been switched on by the activation of the alarm condition, i.e., the opening of the doors.

During the 60 second period, the system 10 will not switch to the valet mode. Upon the expiry of the 60 second timer, the system will switch off the dome light, pager and siren, return the system to the armed state, (slow flashing red LED), and flash the interior and hazard lights for 1 minute and turn on the siren for 1 minute.

Upon the expiry of the alarm cycle, the system 10 will revert to passively arming the system followed by fully arming the system.

An intrusion attempt warn away feature can be initiated in the following cases: if the system 10 is disarmed, and the system detects an attempt at intrusion from a shock sensor, the system will immediately begin to passively arm the system. If the system is armed (slow flashing RED LED), and an attempt at intrusion is detected, the system will chirp the siren 3 times accompanied by 3 flashes on the hazards. In both the above cases, upon disarming the system the system will chirp the siren 3 times and flash the hazards 3 times.

Upon selecting the intrusion attempt retention feature from the user program mode, this feature allows the user to determine whether or not the alarm was activated in their absence, and if so, which input triggered the alarm condition. The system 10 will store the 5 most current events that activated the alarm condition. Once 5 events have been stored, the sixth event will cause the system to erase the first event (LIFO—Last In First Out). While in this mode, the number of flashes and color of the bi-state LED will indicate what input triggered the alarm.

Outlined below is a table indicating the number of flashes of the LED and color versus the input that caused the trigger.

| LED Flashes | Color | Alarm Input |
| --- | --- | --- |
| 2 | Green | Sensor trigger #1 |
| 3 | Green | Sensor trigger #2 |
| 4 | Red | Trunk |
| 5 | Red | Hood |
| 7 | Red | Ignition |
| 6 | Red | Doors |

Entry into the User Program Mode is achieved by the following procedure: turn the ignition switch of the vehicle to the on position, press the valet switch 27 and hold for four seconds and release. The vehicle security system 10 is now in the full valet mode indicated by a steady ORANGE LED. The valet switch 27 is pressed and held for a further four seconds and released. The system 10 will confirm audibly via the siren and visually via the bi-state LED that the system is in the User Program Mode. While in this mode, the valet button 27 is kept depressed and button #4 52d on the transmitter is pressed to enter the installer program mode. In either program mode, the system will revert to a steady GREEN LED which is the first mode in the program. An alarm chirp confirms the number.

Momentarily pressing the valet switch 27 and releasing it will increment the program mode to the next feature. The net result is that the valet switch is used to scroll down the customer or installer set-up menu. Each time the valet switch 27 is pressed, the LED 34 mounted in the valet switch housing will change color associated with the feature selected. Button #1 52a on the transmitter 50 may then be used to select between the factory default settings and the programmable setting. Once the customer program mode has been accessed, and no input is selected by the microprocessor for a period of 30 seconds, the system will revert to the disarmed state. In addition, to exit the program mode, the valet switch 27 may be depressed for 4 seconds. The system will indicate visually and audibly that the system us out of the program mode. The user can exit the program mode at any given time by following the above procedure.

The vehicle security system 10 may be totally reset by observing the following procedure. With power to the system off: insert the key into the ignition switch, turn the ignition switch to the on position, press and hold depressed the Valet switch 27, and turn the power to the system on. The bi-state LED will light up ORANGE. Then press the second function button 53 on the transmitter and thereafter button #4 52d on the transmitter. The LED will light up GREEN while the code from the transmitter 50 is being learned, thereafter the LED will extinguish.

Figure 5:
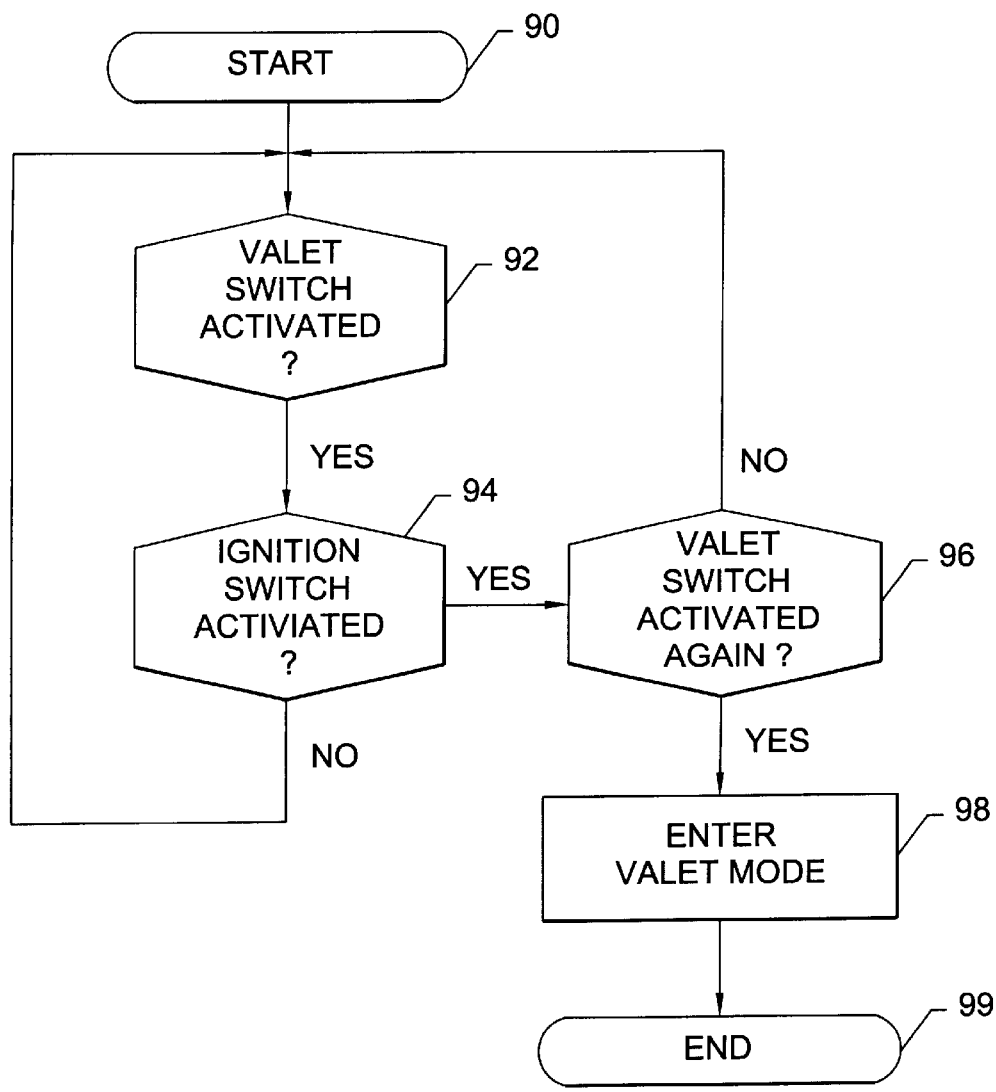
FIG. 5 is a flow chart illustrating a first valet feature according to the present invention.

Referring to the flow chart illustrated in FIG. 5, from the start (Block 90), a determination is made as to whether the valet switch has been activated at Block 92. If the valet switch has been activated, a determination is made as to whether the ignition switch has been activated at Block 94. This is then followed by determining at Block 96 if the valet switch has again been activated. It the valet switch has again been activated, the vehicle security system is placed in the valet mode at Block 98 and the process ends at Block 99. Otherwise, the process loops back to Block 92.

Figure 6:
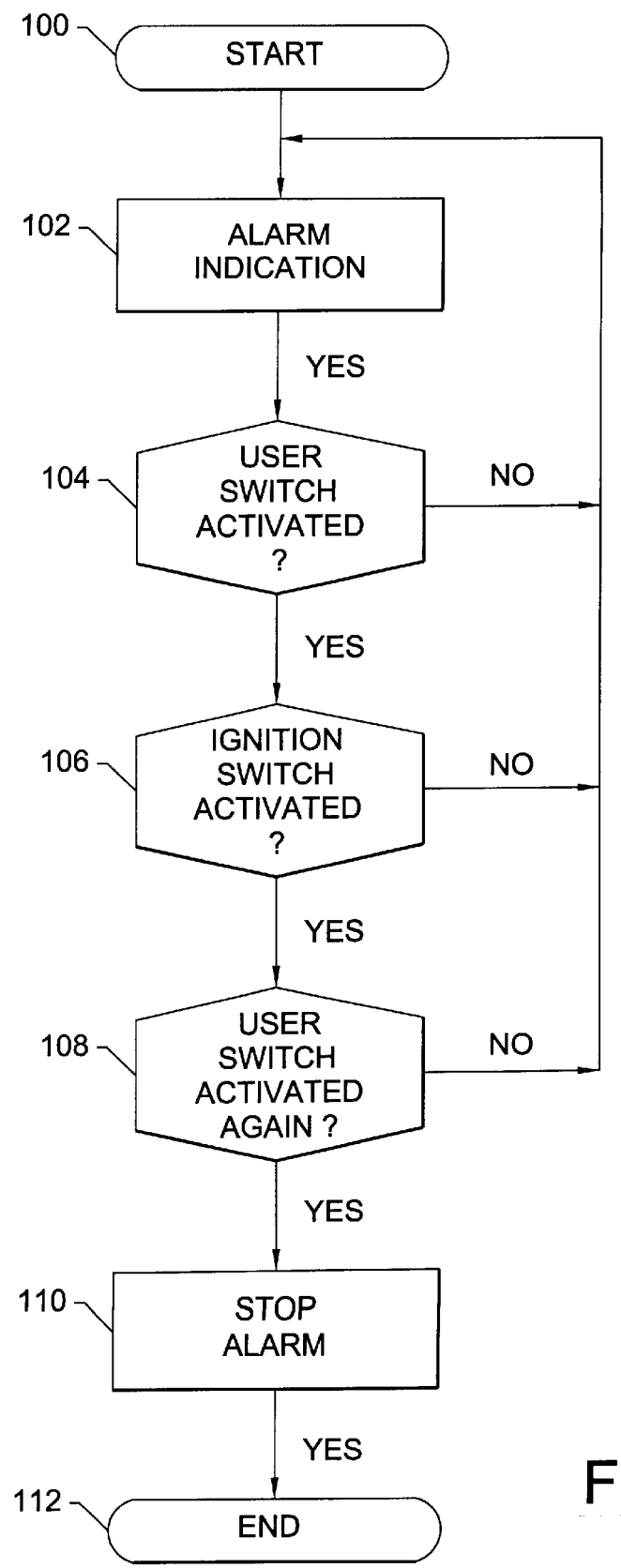
FIG. 6 is a flow chart illustrating a second valet feature according to the present invention.

Referring now additionally to the flow chart illustrated in FIG. 6, from the start (Block 100), the vehicle security system may be in the alarm indication mode as indicated at Block 102. A determination is made as to whether a user switch has been activated at Block 104. If the user switch has been activated, a determination is made as to whether the ignition switch has been activated at Block 106. This is then followed by determining at Block 108 if the user switch has again been activated. If the user switch has again been activated, the alarm indication mode is stopped at Block 110 and the process ends at Block 112. Otherwise, if none of the respective switches have been activated at Blocks 104, 106 and 108, the process loops back to Block 102.

Further information relating to the vehicle security system may be found in copending patent applications filed concurrently herewith and entitled: Vehicle Security System Having Enhanced False Alarm Compensation, Vehicle Security System Having Enhanced Vehicle Door Locking Features, and Vehicle Security System Having Enhanced Control Features. All of these applications are assigned to the assignee of the present invention and incorporated herein by reference in their entirety.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A vehicle security system comprising:
   at least one vehicle sensor;
   an ignition monitor for determining whether a vehicle ignition switch is in an off position or an on position;
   an alarm indicator for indicating an alarm;
   a valet switch accessible to a user within the vehicle; and
   a controller operatively connected to said at least one vehicle sensor, said ignition monitor, said alarm indicator, and said valet switch, said controller being switchable to a valet mode based upon determining a plurality of successive activations of said valet switch, with each activation comprising at least one operation of said valet switch, and based upon determining at least one change in ignition switch position between successive activations of said valet switch.

2. A vehicle security system according to claim 1 wherein said controller is switchable to an armed mode in which said controller is capable of generating an alarm responsive to triggering of said at least one vehicle sensor; and wherein said controller when in the valet mode prevents generation of an alarm responsive to triggering of said at least one vehicle sensor.

3. A vehicle security system according to claim 1 wherein said controller enters a triggered mode generating an alarm indication responsive to triggering of said at least one vehicle sensor when in an armed mode; and wherein entering the valet mode from the triggered mode stops the alarm indication.

4. A vehicle security system according to claim 1 wherein said controller is switchable to the valet mode further based upon determining the ignition switch being in the on position during each activation of said valet switch.

5. A vehicle security system according to claim 1 wherein the at least one change in ignition switch position comprises a change to the off position.

6. A vehicle security system according to claim 1 wherein said controller is switchable to the valet mode further based upon determining the ignition switch being in the on position during each activation of said valet switch and wherein the at least one change in the ignition switch position comprises a change to the off position.

7. A vehicle security system according to claim 1 further comprising at least one remote transmitter to be carried by the user, and a receiver at the vehicle for receiving signals from said at least one remote transmitter; and wherein said controller is connected to said receiver for switching between an armed mode and a disarmed mode responsive to said at least one remote transmitter.

8. A vehicle security system according to claim 7 wherein said at least one remote transmitter uses a pseudorandom code.

9. A vehicle security system comprising:
at least one vehicle sensor;
an ignition monitor for determining whether a vehicle ignition switch is in an off position or an on position;
an alarm indicator for indicating an alarm;
a valet switch accessible to a user within the vehicle; and
a controller operatively connected to said at least one vehicle sensor, said ignition monitor, said alarm indicator, and said valet switch, said controller being switchable to a valet mode based upon determining a plurality of successive activations of said valet switch, with each activation comprising at least one operation of said valet switch, and based upon determining the ignition switch being in the on position during each activation and in the off position between successive activations of said valet switch.

10. A vehicle security system according to claim 9 wherein said controller is switchable to an armed mode in which said controller is capable of generating an alarm responsive to triggering of said at least one vehicle sensor; and wherein said controller when in the valet mode prevents generation of an alarm responsive to triggering of said at least one vehicle sensor.

11. A vehicle security system according to claim 9 wherein said controller enters a triggered mode generating an alarm indication responsive to triggering of said at least one vehicle sensor when in an armed mode; and wherein entering the valet mode from the triggered mode stops the alarm indication.

12. A vehicle security system according to claim 9 further comprising at least one remote transmitter to be carried by the user, and a receiver at the vehicle for receiving signals from said at least one remote transmitter; and wherein said controller is connected to said receiver for switching between an armed mode and a disarmed mode responsive to said at least one remote transmitter.

13. A vehicle security system according to claim 12 wherein said at least one remote transmitter uses a pseudorandom code.

14. A vehicle security system comprising:
at least one vehicle sensor;
an ignition monitor for determining whether a vehicle ignition switch is in an off position or an on position;
an alarm indicator for indicating an alarm;
a switch accessible to a user within the vehicle; and
a controller operatively connected to said at least one vehicle sensor, said ignition monitor, said alarm indicator, and said switch, said controller being switchable to a mode stopping generation of an alarm indication based upon determining a plurality of successive activations of said switch, with each activation comprising at least one operation of said switch, and based upon determining at least one change in ignition switch position between successive activations of said switch.

15. A vehicle security system according to claim 14 wherein said controller is switchable to the mode based upon determining the ignition switch being in the on position during each activation of said switch.

16. A vehicle security system according to claim 14 wherein the at least one change in ignition switch position comprises a change to the off position.

17. A vehicle security system according to claim 14 wherein said controller is switchable to the mode further based upon determining the ignition switch being in the on position during each activation of said switch and wherein the at least one change in the ignition switch position comprises a change to the off position.

18. A vehicle security system according to claim 14 further comprising at least one remote transmitter to be carried by the user, and a receiver at the vehicle for receiving signals from said at least one remote transmitter; and wherein said controller is connected to said receiver for switching between an armed mode and a disarmed mode responsive to said at least one remote transmitter.

19. A vehicle security system according to claim 18 wherein said at least one remote transmitter uses a pseudorandom code.

20. A method for operating a vehicle security system comprising at least one vehicle sensor, an ignition monitor for determining whether a vehicle ignition switch is in an off position or an on position, an alarm indicator for indicating an alarm, a valet switch accessible to a user within the vehicle, and a controller operatively connected to the at least one vehicle sensor, the ignition monitor, the alarm indicator, and the valet switch, the method comprising:
switching the controller to a valet mode based upon determining
a plurality of successive activations of the valet switch with each activation comprising at least one operation of the valet switch, and
at least one change in ignition switch position between successive activations of the valet switch.

21. A method according to claim 20 wherein the controller is switchable to an armed mode in which the controller is capable of generating an alarm responsive to triggering of the at least one vehicle sensor; and wherein the controller when in the valet mode prevents generation of an alarm responsive to triggering of the at least one vehicle sensor.

22. A method according to claim 20 wherein the controller enters a triggered mode generating an alarm indication responsive to triggering of the at least one vehicle sensor when in an armed mode; and wherein entering the valet mode from the triggered mode stops the alarm indication.

23. A method according to claim 20 wherein the switching is further based upon determining the ignition switch being in the on position during each activation of the valet switch.

24. A method according to claim 20 wherein the at least one change in ignition switch position comprises a change to the off position.

25. A method according to claim 20 wherein the switching is further based upon determining the ignition switch being in the on position during each activation of the valet switch and wherein the at least one change in the ignition switch position comprises a change to the off position.

26. A method according to claim 20 wherein the security system further comprises at least one remote transmitter to be carried by the user, and a receiver at the vehicle for receiving signals from the at least one remote transmitter; and wherein the controller is connected to the receiver for switching between an armed mode and a disarmed mode responsive to the at least one remote transmitter.

27. A method according to claim 26 wherein the at least one remote transmitter uses a pseudorandom code.

28. A method for switching a vehicle security system to a mode stopping generating of an alarm indication responsive to activation of a valet switch and based upon ignition switch position, the method comprising:
   monitoring the valet switch and the ignition switch position; and
   switching the controller to the mode based upon determining
   a plurality of successive activations of the switch with each activation comprising at least one operation of the valet switch, and
   at least one change in ignition switch position between successive activations of the valet switch.

29. A method according to claim 28 wherein the switching is further based upon determining the ignition switch being in the on position during each activation of the valet switch.

30. A method according to claim 28 wherein the at least one change in ignition switch position comprises a change to the off position.

31. A method according to claim 28 wherein the switching is further based upon determining the ignition switch being in the on position during each activation of the switch and wherein the at least one change in the ignition switch position comprises a change to the off position.

32. A method according to claim 28 wherein the security system further comprises at least one remote transmitter to be carried by the user, and a receiver at the vehicle for receiving signals from the at least one remote transmitter; and wherein the controller is connected to the receiver for switching between an armed mode and a disarmed mode responsive to the at least one remote transmitter.

33. A method according to claim 32 wherein the at least one remote transmitter uses a pseudorandom code.

\* \* \* \* \*